(12) United States Patent
Kim

(10) Patent No.: US 9,083,778 B2
(45) Date of Patent: Jul. 14, 2015

(54) ADAPTER FOR CONNECTING TWO MOBILE DEVICES

(71) Applicant: Samsung Electronics Co. Ltd., Suwon-si, Gyeonggi-do (KR)

(72) Inventor: Heonchol Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 202 days.

(21) Appl. No.: 13/847,761

(22) Filed: Mar. 20, 2013

(65) Prior Publication Data

US 2013/0260828 A1 Oct. 3, 2013

(30) Foreign Application Priority Data

Mar. 28, 2012 (KR) ........................ 10-2012-0031428

(51) Int. Cl.
| | | |
|---|---|---|
| H04B 1/38 | (2006.01) | |
| H04M 1/02 | (2006.01) | |
| G06F 1/16 | (2006.01) | |
| H01R 31/06 | (2006.01) | |
| H04B 1/3877 | (2015.01) | |
| H04M 1/04 | (2006.01) | |
| H04M 1/725 | (2006.01) | |
| H01R 13/627 | (2006.01) | |

(52) U.S. Cl.
CPC ............ *H04M 1/0256* (2013.01); *G06F 1/1632* (2013.01); *G06F 1/1656* (2013.01); *H01R 31/06* (2013.01); *H01R 13/6278* (2013.01); *H04B 1/3877* (2013.01); *H04M 1/0214* (2013.01); *H04M 1/0274* (2013.01); *H04M 1/04* (2013.01); *H04M 1/72527* (2013.01)

(58) Field of Classification Search
USPC .......... 455/550, 74.1, 557; 710/303; 381/387; 361/679.44; 439/248
See application file for complete search history.

(56) References Cited

U.S. PATENT DOCUMENTS

| | | | |
|---|---|---|---|
| 8,721,356 B2 * | 5/2014 | Webb et al. .................. | 439/248 |
| 2002/0109961 A1 | 8/2002 | Glad | |
| 2003/0109280 A1 | 6/2003 | Bodnar et al. | |
| 2008/0074443 A1 | 3/2008 | Taniguchi et al. | |
| 2008/0273297 A1 | 11/2008 | Kumar | |
| 2009/0070500 A1 | 3/2009 | Suomela et al. | |
| 2009/0149050 A1 | 6/2009 | Lyu et al. | |
| 2009/0292851 A1 * | 11/2009 | Mead et al. .................. | 710/303 |
| 2010/0069117 A1 | 3/2010 | Knighton | |
| 2011/0170256 A1 * | 7/2011 | Lee ........................ | 361/679.44 |
| 2012/0189156 A1 * | 7/2012 | Leung ........................ | 381/387 |

FOREIGN PATENT DOCUMENTS

| | | |
|---|---|---|
| EP | 2 224 692 A2 | 9/2010 |
| GB | 2 479 996 A | 11/2011 |
| JP | 2000-214950 A | 8/2000 |
| KR | 10-2003-0013914 A | 2/2003 |
| KR | 10-2004-0051081 A | 6/2004 |
| KR | 10-2006-0133004 A | 12/2006 |

* cited by examiner

*Primary Examiner* — David Q Nguyen
(74) *Attorney, Agent, or Firm* — Jefferson IP Law, LLP

(57) ABSTRACT

An adaptor for connecting a first mobile terminal and a second mobile terminal is provided. The adaptor includes a first connector detachable from the second mobile terminal and electrically connected to the second mobile terminal and that can be rotated, a main body having a terminal hole for housing the first mobile terminal, and a second connector positioned at the terminal hole and detachable from the first mobile terminal and for electrically connecting the first connector and the first mobile terminal.

17 Claims, 18 Drawing Sheets

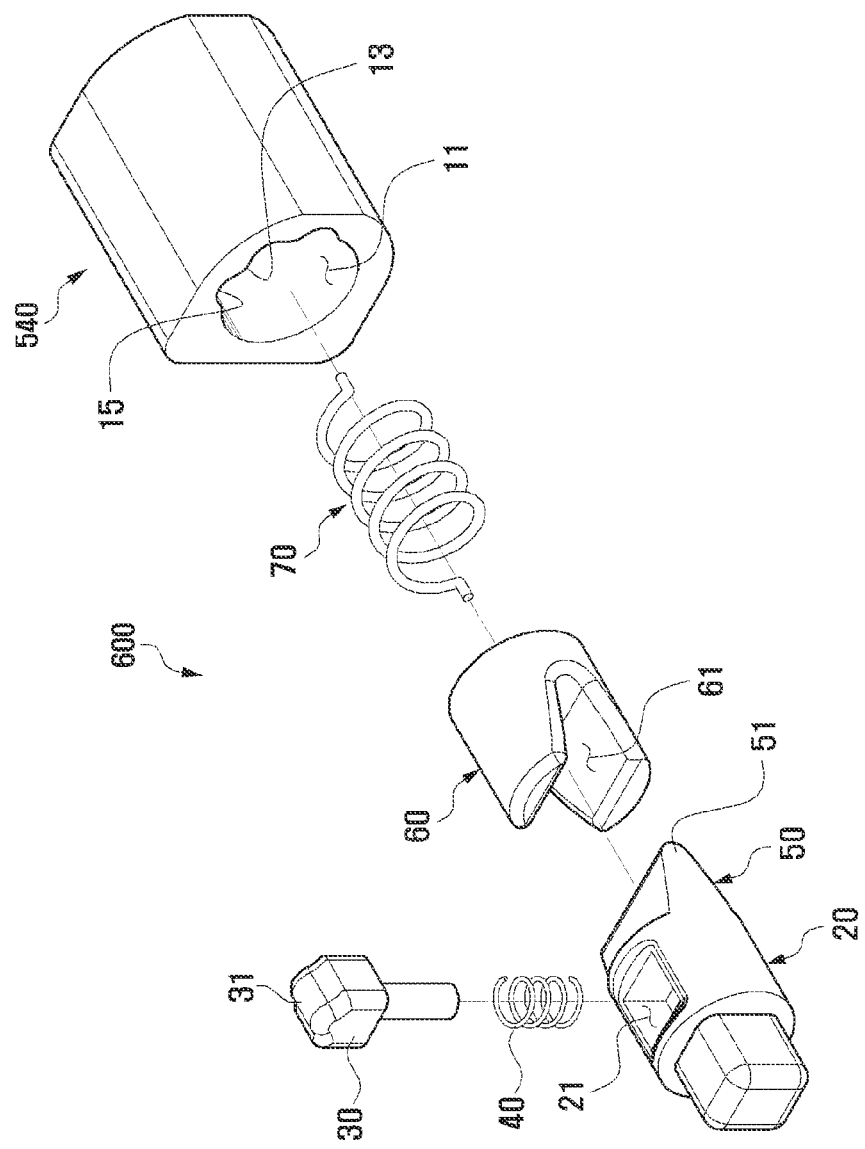

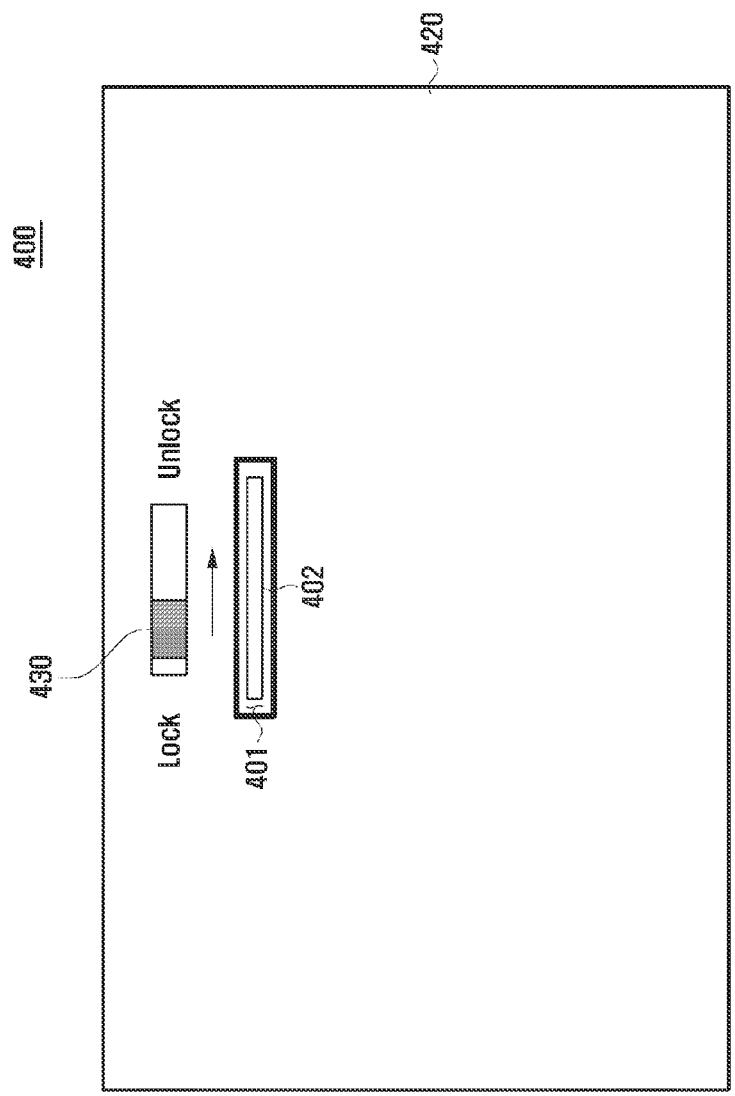

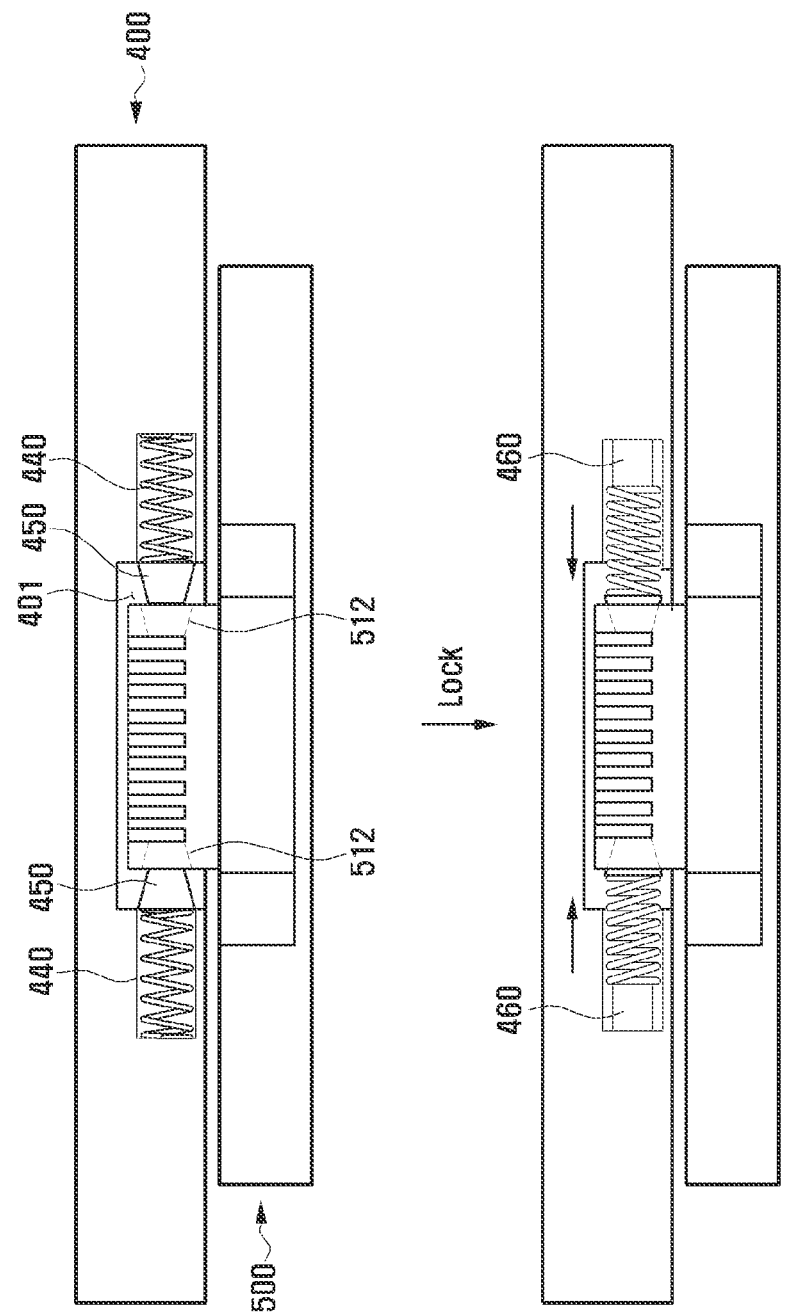

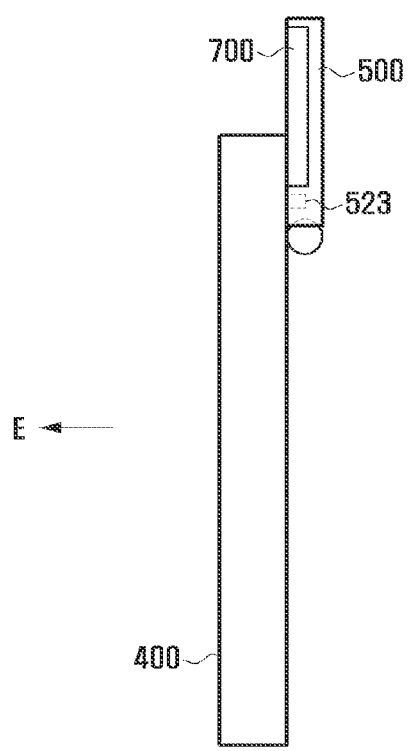
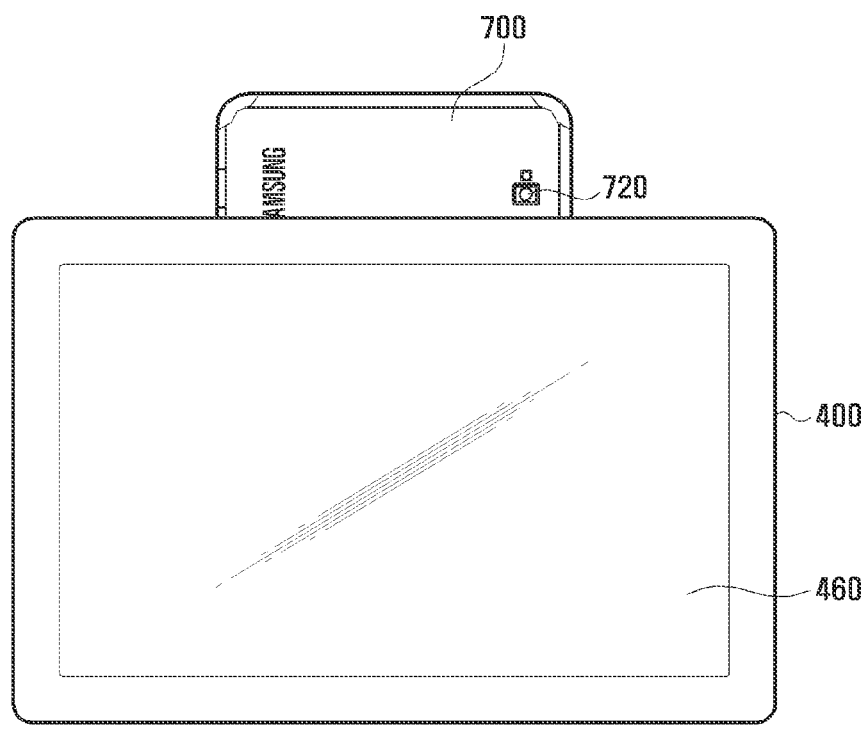

ADAPTER FOR CONNECTING TWO MOBILE DEVICES

PRIORITY

This application claims the benefit under 35 U.S.C. §119(a) of a Korean patent application filed on Mar. 28, 2012 in the Korean Intellectual Property Office and assigned Serial No. 10-2012-0031428, the entire disclosure of which is hereby incorporated by reference.

BACKGROUND OF THE INVENTION

1. Field of the Invention

The present invention relates to an adaptor for connecting two mobile terminals. More particularly, the present invention relates to a connector that improves compatibility of a mutual connection of two mobile terminals by enabling a user to select and use an adaptor that can mechanically connect the two mobile terminals among various adaptors.

2. Description of the Related Art

Mobile terminals are now very widely used as a medium for wireless communication and information exchange. When mobile terminals were first introduced, they were recognized as a device that was easy to carry and able to perform wireless communication. However, mobile terminals now provide advanced services and functions, beyond the simple voice communication, according to various technical developments. For example, the mobile terminal has developed into a multimedia device that includes a phonebook, a game player, a short message service, an e-mail service, a morning call service, a music player, a schedule management function, a digital camera, a wireless Internet service, and the like.

The mobile terminal may be connected to another mobile terminal to be used for an input and output of the other mobile terminal For example, a tablet Personal Computer (PC) may be used for an input and output of a smart phone. The tablet PC has a connector and displays an image received from the smart phone by the control of the smart phone connected through the connector. Further, the tablet PC outputs input information that is input from an input unit thereof, for example the touch screen, to the smart phone through the connector.

As described above, the mobile terminal has a connector for connecting to another mobile terminal However, because the connector is fixed to the mobile terminal, the number and types of other mobile terminals that may be connected to the connector are limited. For example, two mobile terminals may not be mechanically connected according to a position of the connector. Accordingly, there is a need for an adaptor that connects two mobile terminals The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an adaptor for connecting two mobile terminals.

Another aspect of the present invention is provide a connector that improves compatibility of a mutual connection of two mobile terminals by enabling a user to select and use an adaptor that can mechanically connect the two mobile terminals among various adaptors.

Yet another aspect of the present invention is to provide a connector that improves usability and convenience of an adaptor by enabling a mobile terminal to which the adaptor is connected to rotate using as an axis.

Still another aspect of the present invention is to provide a mobile terminal that can be used for an input and output of another mobile terminal, as the mobile terminal is connected to another mobile terminal through the adaptor.

In accordance with an aspect of the present invention, an adaptor for connecting a first mobile terminal and a second mobile terminal is provided. The adaptor includes a first connector detachable from the second mobile terminal and electrically connected to the second mobile terminal and that can be rotated, a main body having a terminal hole for housing the first mobile terminal, and a second connector positioned at the terminal hole and detachable from the first mobile terminal for electrically connecting the first connector and the first mobile terminal.

In accordance with another aspect of the present invention, a mobile terminal is provided. The mobile terminal includes a touch screen, a connector installed at a rear surface opposite to a front surface in which the touch screen is installed, and an adaptor for connecting the mobile terminal and another mobile terminal. The adaptor includes a first connector detachable from the mobile terminal and electrically connected to the mobile terminal and that can be rotated, a main body having a terminal hole for housing the other mobile terminal, and a second connector positioned at the terminal hole and detachable from the other mobile terminal for electrically connecting the first connector and the other mobile terminal.

As described above, in an adaptor and mobile terminal according to the present invention, by connecting two mobile terminals through the adaptor, one mobile terminal is used for an input and output of another mobile terminal. By enabling a user to select and use an adaptor that can mechanically connect two mobile terminals among various adaptors, compatibility of a mutual connection of the two mobile terminals can be improved. By enabling a mobile terminal to which an adaptor is connected to rotate using an axis, usability and convenience of the adaptor can be improved.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 4 is an exploded perspective view illustrating a configuration of a hinge portion according to an exemplary embodiment of the present invention;

FIG. 8 is a rear view illustrating a rear surface of a second mobile terminal according to an exemplary embodiment of the present invention;

FIGS. 9A and 9B are diagrams illustrating a locking device of an adaptor according to an exemplary embodiment of the present invention;

FIGS. 10A to 12B are diagrams illustrating an example of using an adaptor according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

Figure 1:
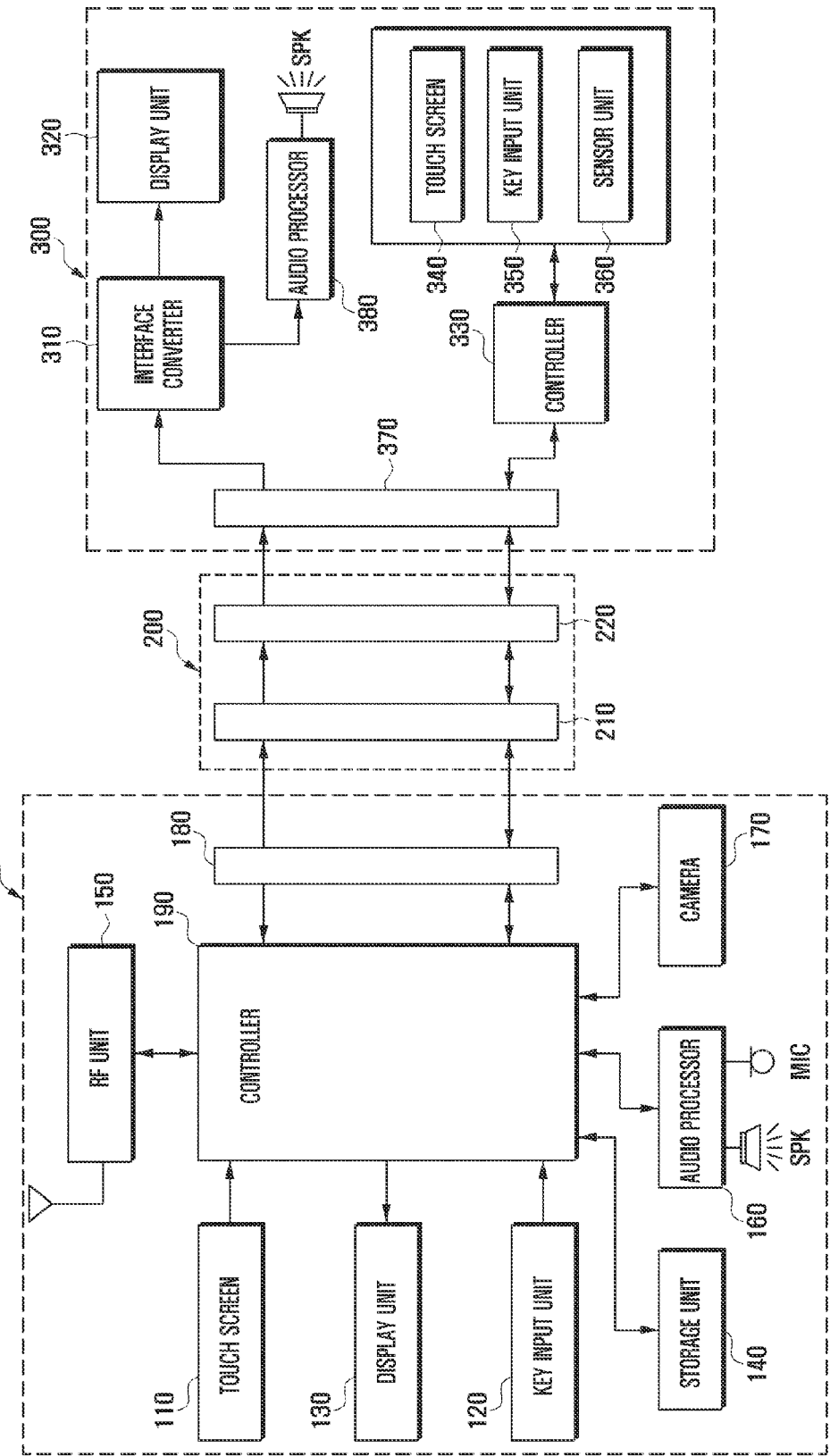
FIG. 1 is a block diagram illustrating a configuration of an adaptor and two mobile terminals that are connected by the adaptor according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, a method and apparatus for performing a function in a mobile terminal according to exemplary embodiments of the present invention are described with reference to the accompanying drawings. Before a description of exemplary embodiments of the present invention, terms or words used hereinafter should not be limitedly analyzed as an ordinary or dictionary meaning but should be analyzed as having a meaning and concept corresponding to the technical scope of the present invention. Therefore, the following description and the accompanying drawings illustrate exemplary embodiments of the present invention and do not represent all technical scopes of the present invention and therefore, at an application time point of the present invention, it should be understood that various equivalent and variations that can replace them may exist. The views in the drawings are schematic views only, and are not intended to be to scale or correctly proportioned.

In accordance with exemplary embodiments of the present invention, a mobile terminal may be a mobile phone, a smart phone, a tablet Personal Computer (PC), a hand-held PC, a Portable a Multimedia Player (PMP), a Personal Digital Assistant (PDA), and the like. Further, in exemplary embodiments of the present invention, the mobile terminal has a touch screen as an input device. In the following description, it is assumed that an exemplary adaptor according to the present invention is applied to a mobile terminal having a touch screen. Further, hereinafter, it is assumed that two mobile terminals connected through an exemplary adaptor according to the present invention each are a smart phone and a dummy tablet PC. Here, the dummy tablet PC is a mobile terminal that does not have a processor, for example a Central Processing Unit (CPU) or an Application Processor (AP) that decodes and executes a command in a computer and that operates by the control of an AP of a connected smart phone.

Hereinafter, an electrical configuration of an exemplary adaptor and a mobile terminal are described with reference to FIG. 1.

FIG. 1 is a block diagram illustrating a configuration of an adaptor and two mobile terminals connected to the adaptor according to an exemplary embodiment of the present invention.

Referring to FIG. 1, a first mobile terminal 100 (i.e., a smart phone) includes a touch screen 110, a key input unit 120, a display unit 130, a storage unit 140, a Radio Frequency (RF) unit 150, an audio processor 160 including a speaker (SPK) and a microphone (MIC), a camera 170, an interface unit 180, and a controller 190.

The touch screen 110 may be mounted at a front surface of the display unit 130. The touch screen 110 detects an occurrence of a touch event in response to a user's touch gesture on the touch screen 110, and outputs the touch event to the controller 190. The controller 190 detects the user's touch gesture from the touch event that is output from the touch screen 110 and controls one or more constituent elements. Here, the touch gesture may include a touch, a tap, a double tap, a press, a drag, a drag-and-drop, a flick, and the like. Here, the touch indicates an action in which a user presses one point of the touch screen 110. The tap indicates an action in which a user touches one point of the touch screen 110 with a finger and then removes the finger without movement of the finger, i.e., lifts the finger from a corresponding point without movement of the finger. The double tap indicates an action in which a user taps one point on the touch screen 110 twice. The press indicates an action in which a user touches the touch screen 110 with a finger for a time period longer than the time period of the tap and removes the finger from a corresponding point without movement of the finger. The drag indicates an action in which a user moves a finger in a predetermined direction in a touch state of one point. The drag-and-drop indicates an action in which a user drags a finger and removes the finger from the screen. The flick indicates an action in which a user moves a finger in a fast speed and then removes the finger from the screen. The controller 190 distinguishes between a flick and a drag based on a speed of the movements. It should be noted that in the above descriptions, a user may use an object such as a stylus instead of a finger to make contact to the touch screen 110. Further, the touch screen 110 may be a resistive type, a capacitive type, and an electromagnetic induction type.

The key input unit 120 includes a plurality of input keys and function keys for receiving an input of numeral or character information and setting of various functions. The function keys may include a direction key, a side key, and a hotkey that are set to perform a specific function. Further, the key input unit 120 generates a key signal related to a user setting and a function control of the mobile terminal 100 and outputs the key signal to the controller 190. The key signals may be classified into a power on/off signal, a volume adjustment signal, a screen on/off signal, and the like. The controller 190 controls the constituent elements in response to such a key signal. Further, the key input unit 120 may include a QWERTY key pad, a 3*4 key pad, a 4*3 key pad, and the like, including a plurality of keys. When the touch screen 110 of the mobile terminal is formed in a full touch screen form, the key input unit 120 may include only at least one side key, for controlling an on/off function of the screen and an on/off function of the mobile terminal, formed at a side surface of a case of the mobile terminal 100.

The display unit 130 converts image data received as an input from the controller 190 to an analog signal and displays the converted analog signal by the control of the controller 190. That is, the display unit 130 provides various screens, for example a lock screen, a home screen, an App execution screen, a menu screen, a key pad screen, a message writing screen, an Internet screen, and the like according to use of the mobile terminal. The lock screen is defined as an image to be displayed when a screen of the display unit 130 is turned on. When a lock release event (e.g., a touch gesture) occurs, the controller 190 converts a displayed image from the lock screen to a home screen or an App execution screen. The home screen is defined as an image including a plurality of app icons corresponding to each of a plurality of Apps. When one of the plurality of App icons is selected by the user, the controller 190 converts an image displayed by executing a corresponding App, for example a camera App, into an execution screen. The display unit 130 is formed as a flat display panel and may be formed of such devices as a Liquid Crystal Display (LCD), Organic Light Emitted Diodes (OLEDs), and Active Matrix Organic Light Emitted Diodes (AMOLEDs).

A data area of the storage unit 140 stores data generated in the mobile terminal 100 according to use of the mobile terminal 100. Further, the data area stores data received from an external source through the RF unit 150. The data area stores the screens displayed by the display unit 130. A menu screen includes a screen conversion key (e.g., a return key for returning to a previous screen) for converting a screen and a control key for controlling a presently executing App. Further, the data area temporarily stores data including data that the user copies from a message, a picture, a web page, a document for copy and paste, and the like. Further, the data area stores various setting values (e.g., screen brightness, whether a vibration occurs when a touch occurs, whether a screen automatically rotates, and the like) for operation of the mobile terminal.

A program area of the storage unit 140 stores an Operation System (OS) and various applications for booting of the mobile terminal and operation of the constituent elements. Various applications are stored and may include, for example, a web browser, a Social Network Service (SNS) App, a music player, a video player, a camera application, and the like.

The RF unit 150 performs audio dedicated communication, audiovisual communication or data communication under the control of the controller 190. For this, the RF unit 150 includes an RF transmitter for up-converting a frequency of a signal to be transmitted and amplifying the signal, and an RF receiver for down-converting a frequency of a received signal and low-noise amplifying the signal. Further, the RF unit 150 includes a mobile communication module (e.g., 3-generation mobile communication module, 3.5-generation mobile communication module or 4-generation mobile communication module), a digital broadcasting module (e.g., a Digital Multimedia Broadcasting (DMB) module), a short range communication module, and the like. Here, the short range communication module wirelessly connects the mobile terminal 100 to an external device and may be a zigbee module, a Wi-Fi module, a Bluetooth module, and the like.

The audio processor 160 performs a function of performing Digital to Analog (DA) conversion of audio data such as a voice that is received as an input from the controller 190, amplifying the analog data, and outputting the analog data to the speaker. The audio processor 160 also performs a function of performing Analog to Digital (AD) conversion of audio data such as a voice that is received as an input from the microphone, and outputting the digital data to the controller 190. The audio processor 160 outputs various sound effects to the speaker under the control of the controller 190. For example, the audio processor 160 outputs a sound effect to the speaker as feedback for conversion from a lock screen to a home screen.

The camera 170 performs a function of photographing a subject by the control of the controller 190 and outputting the subject to the controller 190. More specifically, the camera 170 includes a lens for concentrating light, an image sensor for converting the light to an electrical signal, and an Image Signal Processor (ISP) for processing an electric signal that is input from the image sensor into low data and outputting the low data to the controller 190. Further, the ISP of the camera 170 includes a module for processing low data into a preview image to be displayed on a screen and outputting the preview image to the controller 190, and a module for processing low data into a compression image (e.g., JPEG) and outputting the compression image to the controller 190. Further, the ISP of the camera 170 includes a module for processing a preview image and a compression image into interleaved data and outputting the interleaved data to the controller 190. The image sensor may be a Complementary Metal Oxide Semiconductor (CMOS) image sensor or a Charge Coupled Device (CCD) image sensor. Furthermore, the mobile terminal 100 may include a first camera installed at a front surface and a second camera installed at a rear surface. Here, the front surface is a surface at which the touch screen 110 is disposed, and the rear surface is opposite to the front surface.

The interface unit 180 performs a function of connecting the first mobile terminal 100 to an external device. In the illustrated exemplary implementation, the interface unit 180 connects the first mobile terminal 100 to an adaptor 200. For this, the interface unit 180 includes a connector that is mechanically connected to the adaptor 200. The interface unit 180 outputs data received from the controller 190 to the adaptor 200. Here, the data received from the controller 190 may be image data to be displayed by a second mobile terminal 300 or a control signal for controlling the second mobile terminal 300. The interface unit 180 outputs data received from the adaptor 200 to the controller 190. Here, the data received from the adaptor 200 may be a touch event, a key signal, detection information related to a state of the adaptor 200, and the like.

The controller 190 performs a function of controlling general operations of the first mobile terminal 100, the flow of signals between internal constituent elements of the first mobile terminal 100, and the processing of data by the first mobile terminal 100. The controller 190 controls power supplied from a battery of the first mobile terminal 100 to the internal constituent elements and executes various applications stored at the program area of the storage unit 140. The controller 190 also controls general operations of the second mobile terminal 300 connected through the adaptor 200. More particularly, the controller 190 controls the second mobile terminal 300 to display image data. The controller 190 includes a Central Processing Unit (CPU) or an Application Processor (AP). Here, the AP may be a System on Chip (SoC) of the CPU or a Graphic Processing Unit (GPU). Further, the AP may be formed by packaging the CPU and the GPU into a multi layer.

The first mobile terminal 100 may further include constituent elements that are not described above, such as a Global Positioning System (GPS) reception module and an acceleration sensor. Further, in the mobile terminal 100, a specific constituent element may be excluded from the constituent elements or replaced with another constituent element according to a providing form.

The adaptor 200 includes a first interface unit 210 connected to the first mobile terminal 100 and a second interface unit 220 connected to the second mobile terminal 300. The first interface unit 210 and the second interface unit 220 each includes a connector mechanically connected to the first mobile terminal 100 and the second mobile terminal 300, respectively. The first interface unit 210 outputs data received from the first mobile terminal 100 to the second interface unit 220 and outputs data received from the second interface unit 220 to the first mobile terminal 100. The second interface unit 220 outputs data received from the second mobile terminal 300 to the first interface unit 210 and outputs data received from the first interface unit 210 to the second mobile terminal 300.

The second mobile terminal 300 (i.e., a dummy tablet PC) includes an interface converter 310, a display unit 320, a controller 330, a touch screen 340, a key input unit 350, a sensor unit 360, an interface unit 370, and an audio processor 380 that includes a speaker (SPK).

The interface converter 310 performs a function of converting an interface or format of image data received from the adaptor 200 through the interface unit 370 to an interface or format that the display unit 320 is able to receive and display. Further, the interface converter 310 performs a function of converting an interface or format of audio data received from the adaptor 200 through the interface unit 370 to an interface or format that may be processed in the audio processor 380. The audio processor 380 converts audio data received from the interface converter 310 to an audio signal of an analog form, amplifies the converted audio data, and outputs the amplified audio data to the speaker. Finally, when conversion of the interface is unnecessary, the interface converter 310 may be omitted from a configuration of the second mobile terminal 300. The interface converter 310 may convert, for example, a mobile High-definition Link (mHL) to Low Voltage Differential Signaling (LVDS), a Mobile Industry Processor Interface (MIPI), or a Display Port (DP). Further, the interface converter 310 may convert a High Definition Multimedia Interface (HDMI) to LVDS, MIPI, or DP.

The display unit 320 converts image data received from the interface converter 310 to an analog signal and displays the analog signal. The display unit 320 is formed as a flat display panel and may include technologies such as an LCD, OLED, and AMOLED.

The controller 330 outputs data to the first mobile terminal 100 through the adaptor 200 by the control of the controller 190 of the first mobile terminal 100. That is, the controller 330 performs a function of outputting a touch event that is input from the touch screen 340, a key signal that is input from the key input unit 350, and sensing information that is input from the sensor unit 360 to the controller 190 of the first mobile terminal 100. Further, the controller 330 may perform a function of detecting state information (e.g., angle information) of the adaptor 200 based on sensing information that is input from the sensor unit 360 and outputting the detected state information to the controller 190 of the first mobile terminal. The controller 330 may include a Micro Controller Unit (MCU).

The touch screen 340 is mounted at a front surface of the display unit 320, detects a touch event that occurs in response to the user's touch gesture on the touch screen 340, and outputs the detected touch event to the controller 330. The touch screen 340 may include a resistive type, a capacitive type, and an electromagnetic induction type.

The key input unit 350 receives an input of numeral or character information and includes a plurality of input keys and function keys for setting various functions. The function keys may include a direction key, a side key, and a hotkey that are set to perform a specific function. Further, the key input unit 350 generates a key signal in response to key manipulation of the user and outputs the generated key signal to the controller 330.

The sensor unit 360 senses information related to a physical quantity such as a position and a speed of the second mobile terminal 300, a direction of gravity operating in the second mobile terminal 300, and acceleration and a tilt of the second mobile terminal 300. In an exemplary implementation, the sensor unit 360 includes a magnetic sensor. That is, the sensor unit 360 senses information related to a magnitude and a direction of a magnetic field or a magnetic force line. The sensor unit 360 converts the sensed physical quantity to an electrical signal, performs again Analog to Digital (AD) conversion of the converted electric signal to sensing information, and outputs the sensing information to the controller 330.

The interface unit 370 performs a function of connecting the second mobile terminal 300 to an external device, for example the adaptor 200. For this, the interface unit 370 includes a connector mechanically connected to the adaptor 200. The interface unit 370 outputs data received from the controller 330 to the adaptor 200. Further, the interface unit 370 outputs a control signal received from the adaptor 200 to the controller 330 and outputs image data received from the adaptor 200 to the interface converter 310.

Hereinafter, a configuration of an adaptor and a mobile terminal are described with reference to FIGS. 2 to 9.

Figure 2:
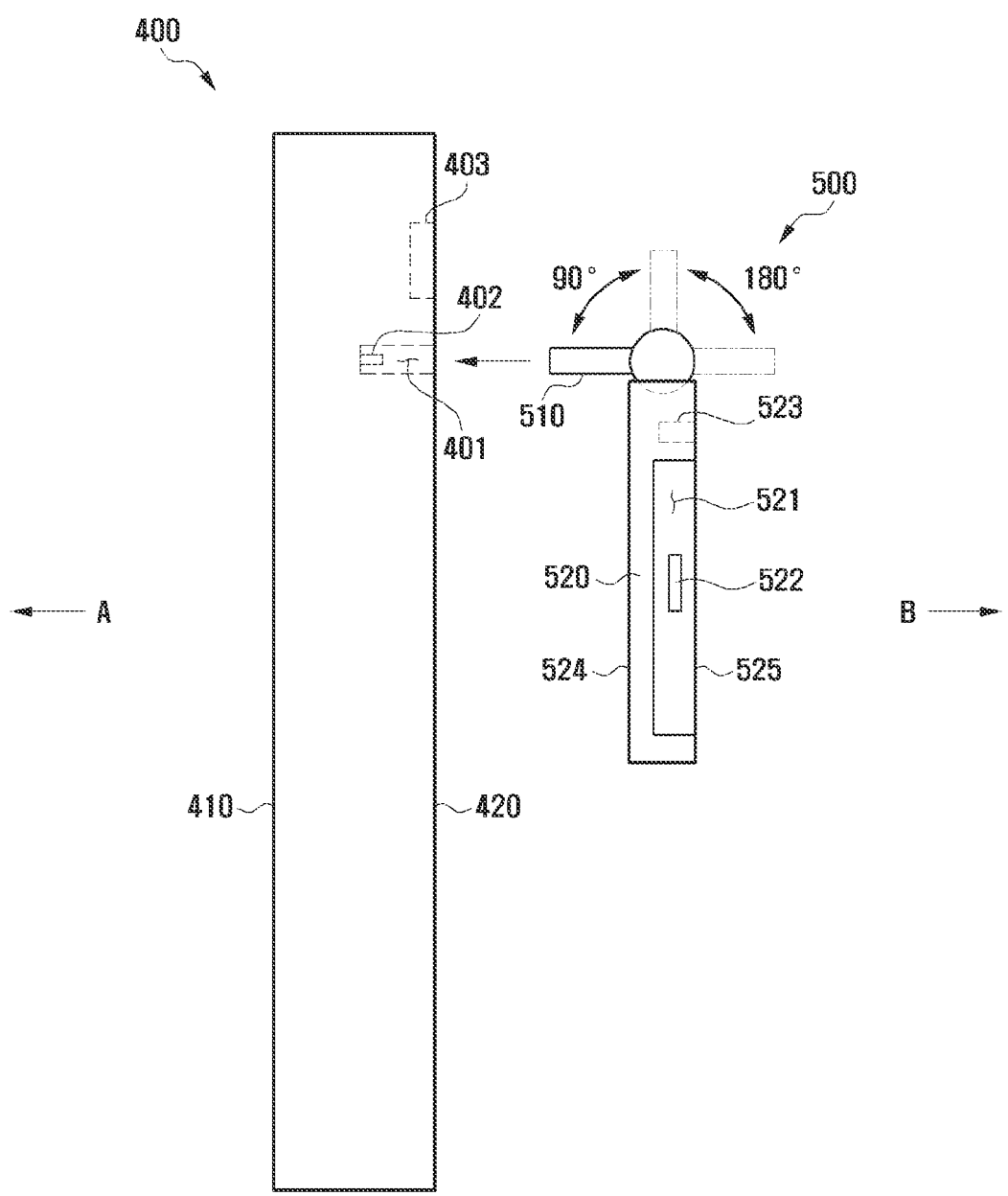
FIG. 2 is a side view illustrating a side surface of an adaptor and a second mobile terminal connected to the adaptor according to an exemplary embodiment of the present invention.

FIG. 2 is a side view illustrating a side surface of an adaptor and a second mobile terminal connected to the adaptor according to an exemplary embodiment of the present invention.

Referring to FIG. 2, a touch screen is installed at a first surface 410 of a second mobile terminal 400 (i.e., a dummy tablet PC). A connector hole 401 for housing a first connector 510 of an adaptor 500 is formed at a second surface 420 of the second mobile terminal 400. Hereinafter, the first surface 410 of the second mobile terminal 400 is referred to as a front surface. The second surface 420 is referred to as a rear surface. A connector 402 of the second mobile terminal 400 is disposed at the connector hole 401. A magnetic sensor 403 is installed at an upper end portion of the connector hole 401. The magnetic sensor 403 senses information related to a magnitude and a direction of a magnetic field or a magnetic force line and outputs the sensed information to a controller of the second mobile terminal 400. The controller of the second mobile terminal 400 detects angle information of the adaptor 500 based on the sensed information.

The first connector 510 of the adaptor 500 is installed at an upper surface of a main body 520 and is inserted into the connector hole 401 to be connected to the connector 402 of the second mobile terminal 400. The first connector 510 of the adaptor 500 has a rotatable structure. As shown in FIG. 2, the first connector 510 of the adaptor 500 may rotate from 0° to 180°. A rotation angle of the first connector 510 is not limited thereto and the first connector 510 may rotate to an angle of 180° or more according to a hinge structure applied to the first connector 510 of the adaptor 500.

When the first connector 510 is inserted into the connector hole 401, the main body 520 may rotate. When the first connector 510 is at 0°, a first surface 524 of the main body 520 faces the left side A, and a second surface 525 thereof faces the right side B. When the first connector 510 is at 90°, the main body 520 and the second mobile terminal 400 are orthogonal. When the first connector 510 is at 180°, the first surface 524 of the main body 520 faces the right side B, and the second surface 525 faces the left side A. Hereinafter, the first surface 524 of the main body 520 is referred to as a rear surface. The second surface 525 is referred to as a front surface.

As shown in FIG. 2, the first connector 510 of the adaptor 500 may stop at an angle of 0°, 90°, and 180°. For example, when an external force is applied to the first connector 510, the first connector 510 may rotate. In an exemplary implementation, the first connector 510 may further stop at an angle of, for example, 30° or 45° in addition to the above-described 0°, 90°, and 180°.

In the main body 520 of the adaptor 500, a terminal hole 521 for housing the first mobile terminal (i.e., the smart phone) is formed. That is, the terminal hole 521 is formed at the front surface 525. A second connector 522 connected to the connector of the first terminal is disposed at the terminal hole 521. Further, a magnet 523 is installed within the main body 520.

In a state in which the first connector 510 of the adaptor 500 is inserted into the connector hole 401, the main body 520 can rotate. As a position of the magnet 523 changes according to such a rotation, a magnitude and a direction of a magnetic field or a magnetic force line sensed by the magnetic sensor 403 also changes. A controller of the second mobile terminal 400 detects angle information (i.e., 0°, 90°, or 180°) of the adaptor 500 based on information sensed by the magnetic sensor 403.

Figure 3:
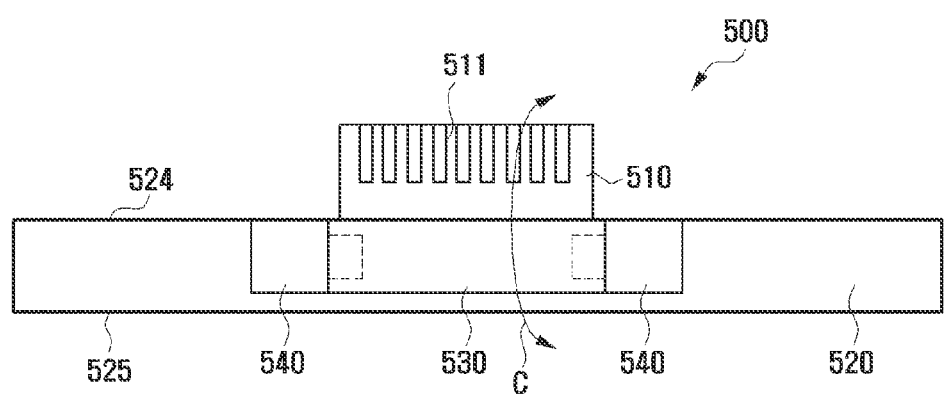
FIG. 3 is a top plan view illustrating an upper surface of an adaptor according to an exemplary embodiment of the present invention.

FIG. 3 is a top plan view illustrating an upper surface of an adaptor according to an exemplary embodiment of the present invention.

Referring to FIG. 3, the adaptor 500 includes the first connector 510, the main body 520, a rotation portion 530, a fixing portion 540, and a hinge portion (not shown).

Here, the hinge portion is installed within the fixing portion 540 and connects the fixing portion 540 and the rotation portion 530. The fixing portion 540 is fixed to an upper surface 524 of the main body 520. The first connector 510 is fixed to the rotation portion 530, and the rotation portion 530 rotates (i.e., C) using the fixing portion 540 as an axis. That is, the first connector 510 rotates using the fixing portion 540 as an axis. In an exemplary implementation, the first connector 510 may stop at three steps of 0°, 90°, and 180°, as shown in FIG. 2. Further, the first connector 510 includes a plurality of pins. Reference numeral 511 representatively indicates one of the plurality of pins. The hinge portion not shown in FIG. 3 includes a stopper for stopping.

Hereinafter, an exemplary hinge portion that can be applied to the present invention is described with reference to FIGS. 4 to 6.

FIG. 4 is an exploded perspective view illustrating a configuration of a hinge portion according to an exemplary embodiment of the present invention.

Referring to FIG. 4, a hinge portion 600 includes a first shaft 20, a stopper 30, a shaft spring 40, a hinge cam 50, a second shaft 60, and a housing spring 70.

The fixing portion 540 has a structure including a hinge hole 11 for housing the first shaft 20, the hinge cam 50, the housing spring 70, and the hinge shaft 50. In this case, the fixing portion 540 has at least one latch groove 15 in an internal wall 13 of the hinge hole 11. Referring to FIG. 4, for example, three latch grooves 15 are formed at a separation of 90° using the center of the hinge hole 11 as an axis.

The first shaft 20 connects the rotation portion 530 and the fixing portion 540. A portion of the first shaft 20 is housed in the rotation portion 530 to be fixed to the rotation portion 530, and the remaining portions are housed in the hinge hole 11 of the fixing portion 540 so as to rotate. That is, the first shaft 20 is fixed to the rotation portion 530 and rotates about the fixing portion 540. In this case, when the first shaft 20 is housed in the fixing portion 540, the first shaft 20 has a structure in which the shaft groove 21 is formed at a position corresponding to the latch groove 15. That is, when the first shaft 20 rotates, the latch groove 15 passes through an upper portion of the shaft groove 21.

One end (i.e., a lower end of FIG. 4) of the stopper 30 is inserted into the shaft groove 21. The other end 31 (i.e., the other end of FIG. 4) of the stopper 30 is exposed from the shaft groove 21. The other end 31 of the stopper 30 has a form (e.g., a protrusion form) corresponding to the latch groove 15.

The shaft spring 40 connects the first shaft 20 and the stopper 30 in the shaft groove 21. When the first shaft 20 rotates, the shaft spring 40 provides an elastic force so that the stopper 30 protrudes from the shaft groove 21 to be fastened to the latch groove 15. When the stopper 30 is separated from the latch groove 15, the shaft spring 40 is retracted by the stopper 30.

The hinge cam 50 is coupled to one surface of the second shaft 60 inserted into the fixing portion 540. In this case, the hinge cam 50 has a protruding portion 51 having a tip surface inclined by a predetermined angle from one surface of the first shaft 20.

The second shaft 60 is housed in the fixing portion 540 through the hinge hole 11 and has a structure having a concave portion 61 for fastening to the protruding portion 51 of the hinge cam 50.

The housing spring 70 connects the second shaft 60 and the fixing portion 540 within the hinge hole 11. In order to fasten the concave portion 61 to the protruding portion 51, the housing spring 70 provides an elastic force to the second shaft 60.

FIGS. 5A, 5B, 6A, and 6B are views illustrating operation of a hinge portion according to an exemplary embodiment of the present invention.

Figure 5A:
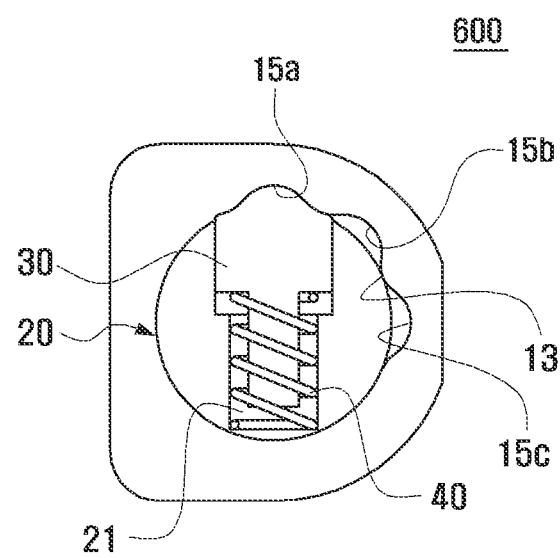
FIGS. 5A, 5B, 6A, and 6B are views illustrating operation of a hinge portion according to an exemplary embodiment of the present invention.
Figure 5B:
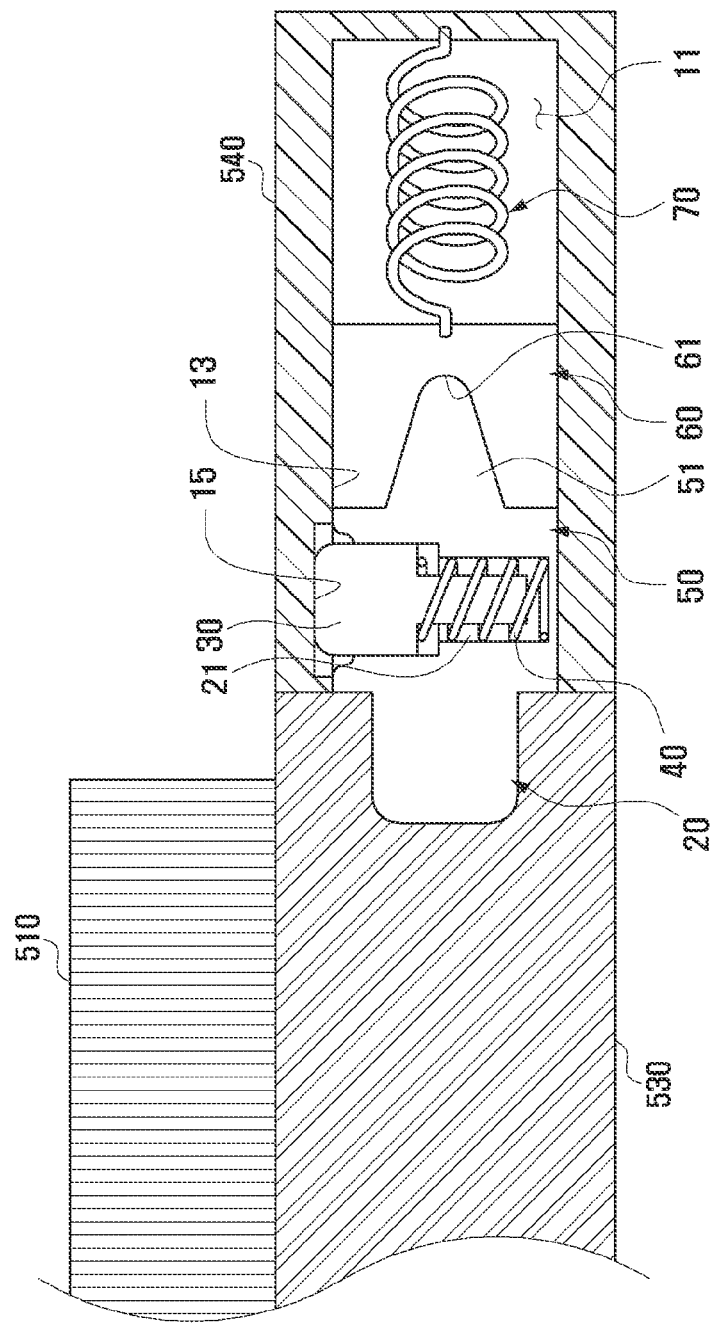

Referring to FIGS. 5A, 5B, 6A, and 6B, in the hinge portion 600, the other end portion of the stopper 30 receives an elastic force from the shaft spring 40, as shown in FIGS. 5A and 5B. Accordingly, the other end portion 31 of the stopper 30 is fastened to the first latch groove 15a and suppresses the first shaft 20 from rotating.

Figure 6A:
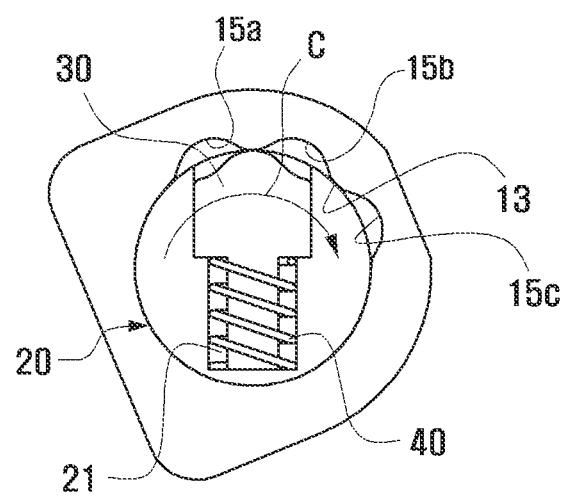
Figure 6B:
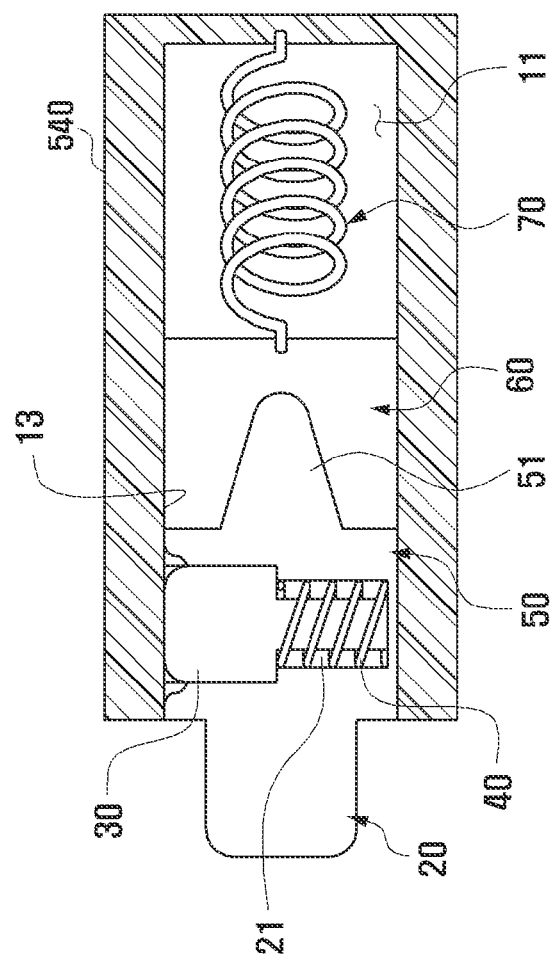

In order to adjust an angle of the main body 520, when the user applies an external force to the main body 520, the first shaft 20 rotates in a direction (e.g., C of FIG. 6A) due to such a force. In this case, the other end 31 of the stopper 30 deviates from the fastened latch groove 15 while applying a pressure to the shaft spring 40, as shown in FIGS. 6A and 6B. The shaft spring 40 is retracted and provides a larger elastic force to the stopper 30 due to a reaction to such retraction. Even if an external force is not applied by such an elastic force, the first shaft 20 continues to rotate (e.g., in the direction C). When a rotation of the first shaft 20 is continued, the other end portion of the stopper 30 is fastened to the second latch groove 15b and suppresses the first shaft 20 from rotating. If rotation of the first shaft 20 continues, the other end portion of the stopper 30 is fastened to the third latch groove 15c and suppresses the first shaft 20 from further rotation.

Figure 7:
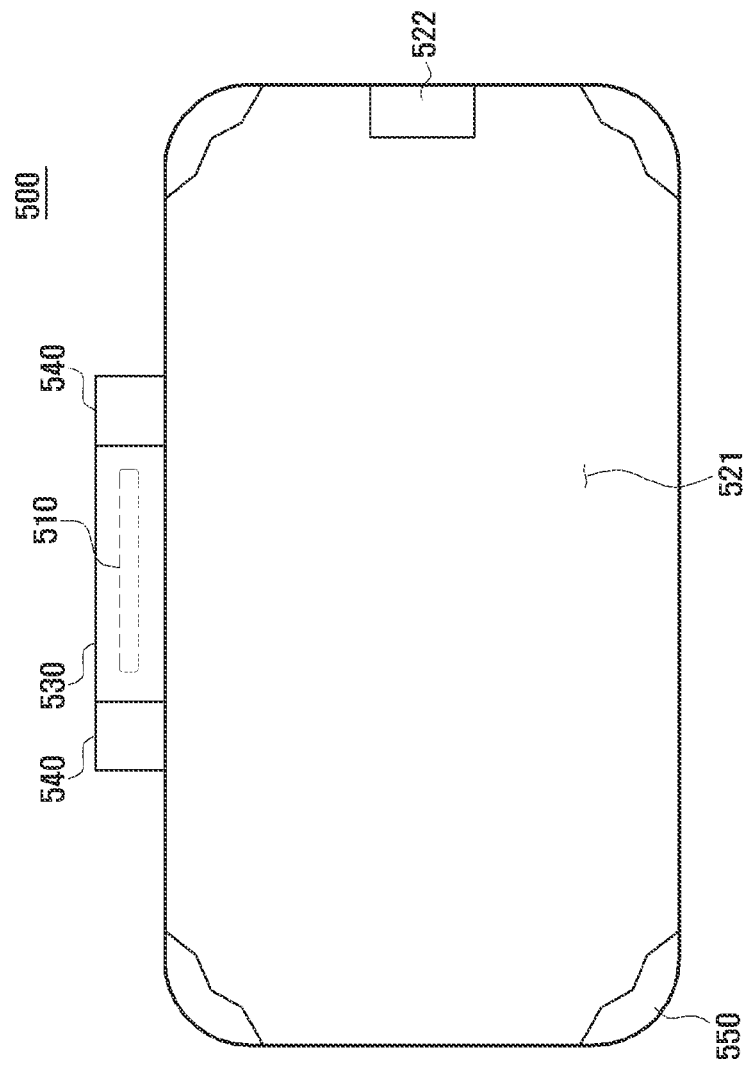
FIG. 7 is a front view illustrating a front surface of an adaptor according to an exemplary embodiment of the present invention.

FIG. 7 is a front view illustrating a front surface of an adaptor according to an exemplary embodiment of the present invention.

Referring to FIG. 7, the terminal hole 521 described with respect to FIG. 2 is illustrated. Further, as shown in FIG. 7, the second connector 522 is disposed at the terminal hole 521. Here, the second connector 522 is electrically connected to the first connector 510. For this, at the inside of the main body 520, a wiring (not shown) for connecting the first connector 510 and the second connector 520 is installed. Further, at four corners of the terminal hole 521, an elastic portion for fixing the first mobile terminal housed in the terminal hole 521 is formed. Reference numeral 550 indicates such an elastic portion. That is, when the first mobile terminal is housed in the terminal hole 521, the elastic portion 550 performs a function of preventing the first mobile terminal from being separated from the terminal hole 521. In the foregoing description, the first mobile terminal is fixed to the terminal hole 521 by the elastic portion 550, but it is not limited thereto and various structures and methods may exist. In a state in which a rear surface of the first mobile terminal is exposed, the user inserts the first mobile terminal into the terminal hole 521. Here, the rear surface is opposite to a front surface of the first mobile terminal at which the touch screen 110 is disposed. In general, cameras are each installed at both surfaces of a smart phone.

FIG. 8 is a rear view illustrating a rear surface of a second mobile terminal according to an exemplary embodiment of the present invention.

Referring to FIG. 8, the connector hole 401 and the connector 402 described with respect to FIG. 2 are illustrated. Further, as shown in FIG. 8, at a rear surface 420 of the second mobile terminal 400, a lock switch 430 for preventing the first connector 510 of the adaptor 500 housed in the connector hole 401 from being separated is installed. That is, when the lock switch 430 is in a 'lock state', the adaptor 500 is not separable from the second mobile terminal 400. On the other hand, when the lock switch 430 is in a 'unlock state', the adaptor 500 may be separated from the second mobile terminal 400, such as by the user's external force.

FIGS. 9A and 9B are diagrams illustrating a locking device of an adaptor according to an exemplary embodiment of the present invention.

Referring to FIG. 9A, the locking device includes a hook spring 440 and a hook 450. Hook spring grooves are formed at both side surfaces of the connector hole 401. The hook spring 440 is installed in the hook spring groove. One end of the hook spring 440 is fixed to a spring moving means 460 housed in the hook spring groove, and the other end thereof is fixed to the hook 450. Hook insertion grooves 512 are formed at both side surfaces of the first connector 510 of the adaptor 500.

Referring to FIG. 9B, when the lock switch 430 is in a lock state, the hook spring 440 is inserted into the hook insertion groove 512. That is, when the user moves the lock switch 430 from unlock to lock, the spring moving means 460 pushes the spring toward the hook insertion groove 512. Accordingly, the hook spring 440 is inserted into the hook insertion groove 512. In contrast, when the user moves the lock switch 430 from lock to unlock, the spring moving means 460 returns to an original position, and the hook spring 440 deviates from the hook insertion groove 512.

FIGS. 10A to 12B are diagrams illustrating a use example of an adaptor according to an exemplary embodiment of the present invention.

Figure 10A:
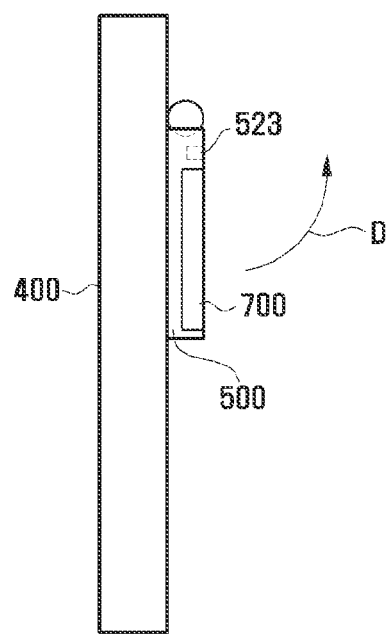

Referring to FIG. 10A, in a state in which a first mobile terminal 700 (i.e., a smart phone) is housed therein, the adaptor 500 is fastened to the second mobile terminal 400 (i.e., a dummy tablet PC). The magnet 523 is installed within the adaptor 500.

Figure 10B:
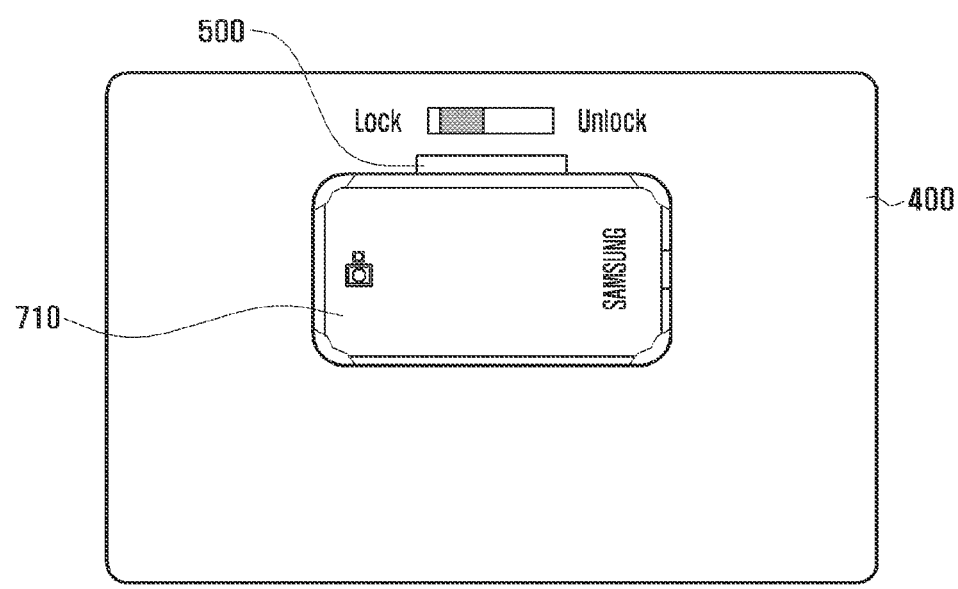

Referring to FIG. 10B, in a state in which a rear surface 710 of the first mobile terminal 700 is exposed, the user inserts the first mobile terminal 700 into the terminal hole of the adaptor 500. Here, the rear surface 710 is opposite to the front surface of the first mobile terminal 700 at which the touch screen is disposed. As shown in FIG. 10B, a camera is installed at the rear surface 710. When the second mobile terminal 400 is connected to the first mobile terminal 700 through the adaptor 500, a controller of the first mobile terminal 700 senses a connection of the second mobile terminal 400. The controller of the first mobile terminal 700 stops an output of image data to a display unit thereof in response to a connection to the second mobile terminal 400 and outputs the image data to the display unit of the second mobile terminal 400. Further, the controller of the first mobile terminal 700 performs a related function in response to user input information (e.g., a touch event, a key signal, etc.) input from the second mobile terminal 400 through the adaptor 500.

Figure 11:
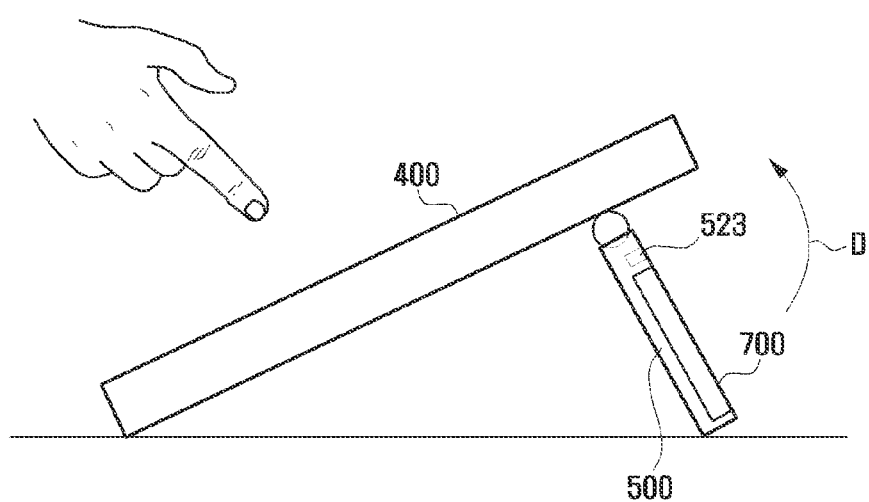

Referring to FIGS. 10A and 11, in a state in which the adaptor 500 is folded, the user rotates the adaptor 500 by applying a force counterclockwise D. Therefore, when the adaptor 500 is perpendicular to the second mobile terminal 400 while rotating, the adaptor 500 stops a rotation.

Referring to FIG. 11, in a state in which the adaptor 500 and the second mobile terminal 400 are orthogonal, the user is able to use the adaptor 500 as a stand of the second mobile terminal 400.

Referring to FIGS. 11, 12A, and 12B, the user rotates the adaptor 500 by applying a force counterclockwise D. Therefore, while the adaptor 500 rotates, when the adaptor 500 is spread, a rotation of the adaptor 500 is stopped. The first mobile terminal 700 faces a front surface E. A magnetic sensor provided in the second mobile terminal 400 senses information related to a position of the magnet 523 and outputs the sensed information to the controller of the second mobile terminal 400. Therefore, the controller of the second mobile terminal 400 outputs the sensed information to the controller of the first mobile terminal 700. Alternatively, the controller of the second mobile terminal 400 detects a position (i.e., angle information of the adaptor 500) of the magnet 523 based on sensing information received from the magnetic sensor. The controller of the first mobile terminal 700 receives position information from the controller of the second mobile terminal 400. Alternatively, the controller of the first mobile terminal 700 receives sensing information from the controller of the second mobile terminal 400 and detects angle information of the adaptor 500 based on the received sensing information. For example, when the user rotates the adaptor 500 and the detected angle information is 180°, the controller of the first mobile terminal 700 drives a camera 720 and outputs a preview image input from the camera 720 to the display unit of the second mobile terminal 400. Therefore, the preview image is displayed through a touch screen 460.

Figure 13:
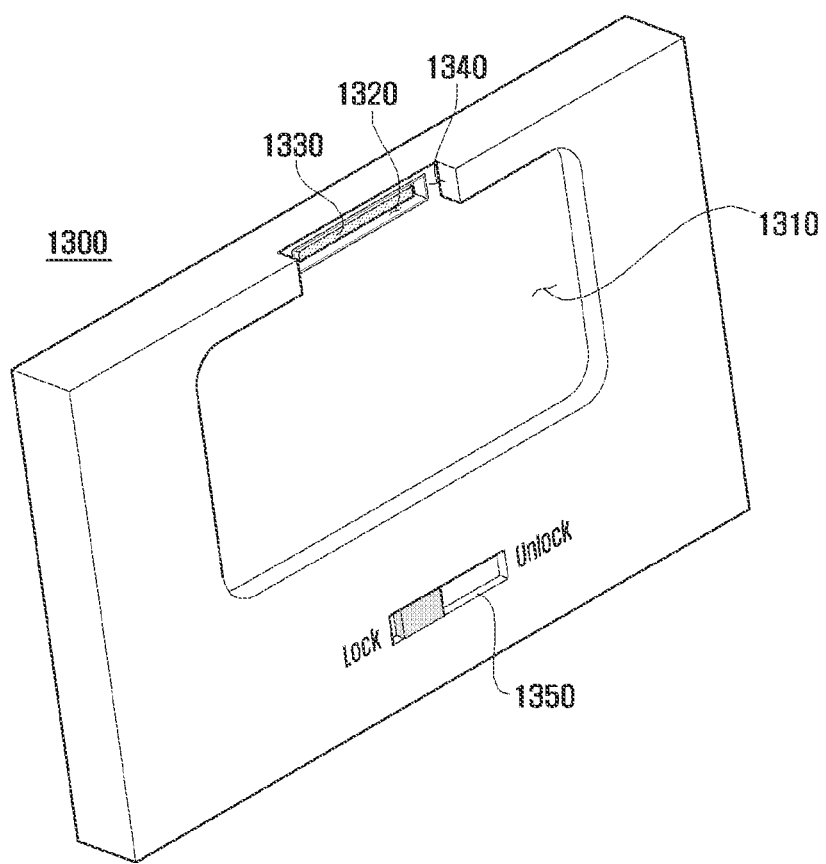
FIG. 13 is a perspective view illustrating a rear surface of a second mobile terminal according to an exemplary embodiment of the present invention.

FIG. 13 is a perspective view illustrating a rear surface of a second mobile terminal according to an exemplary embodiment of the present invention.

Referring to FIGS. 2 and 13, a reception groove 1310 is formed at a rear surface of a second mobile terminal 1300 for housing the adaptor 500. A connector hole 1320 is formed at the surface of the adaptor reception groove 1310 for housing the first connector 510 of the adaptor 500. A connector 1330 of the second mobile terminal 1300 is disposed at the connector hole 1320. The adaptor 500 is housed in the adaptor reception groove 1310, and the first connector 510 of the adaptor 500 is inserted into the connector hole 1320 to be connected to the connector 1330 of the second mobile terminal 1300.

One side 1340 of the adaptor reception groove 1310 is opened, as shown in FIG. 13. This is because in a state in which the adaptor 500 housed in the second mobile terminal 1300 is connected to the second mobile terminal 1300, i.e., in a state in which the first connector 510 is inserted into the connector hole 1320, the adaptor 500 enables to rotate up to, for example, 180°. That is, when the adaptor 500 rotates by 180°, the user may use the first mobile terminal 700 housed in the adaptor 500 for audiovisual communication. Here, as shown in FIG. 11, when one side 1340, for example the adaptor 500, is used as only a stand, the one side 1340 may not be opened.

At a rear surface of the second mobile terminal 1300, a lock switch 1350 for preventing the first connector 510 of the adaptor 500 housed in the connector hole 1320 from being separated is installed. That is, when the lock switch 1350 is in a 'lock state', the adaptor 500 is not separable from the second mobile terminal 1300. When the lock switch 1350 is in an 'unlock state', the adaptor 500 is able to be separated by the user's external force. Although such a lock switch 1350 is not shown, the adaptor 500 may rotate and be thus installed at the surface of the adaptor reception groove 1310. When the lock switch 1350 is installed in the adaptor reception groove 1310, the user manipulates the lock switch 1350 in a state in which the adaptor 500 is rotated by, for example 180°.

Figure 14:
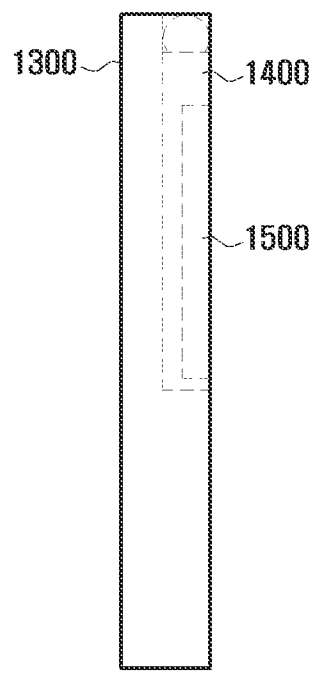
FIGS. 14 to 16 are views illustrating a use example of a second mobile terminal according to an exemplary embodiment of the present invention.
Figure 15:
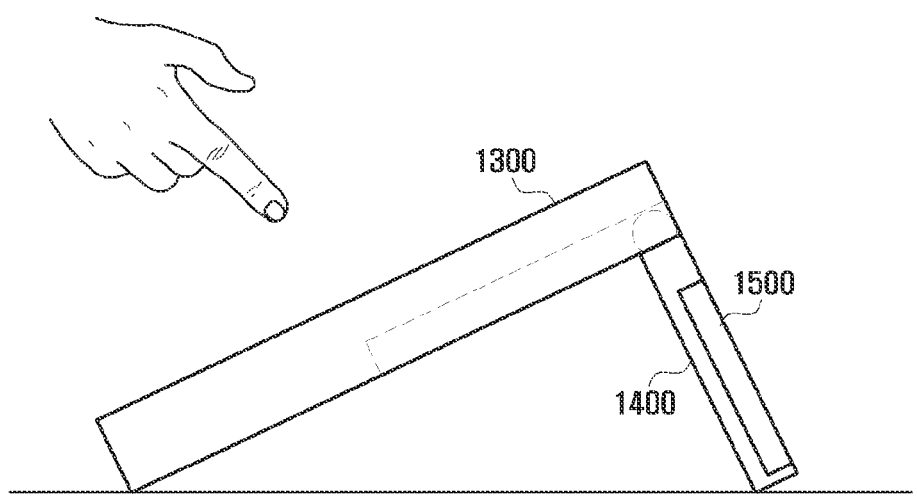
Figure 16:
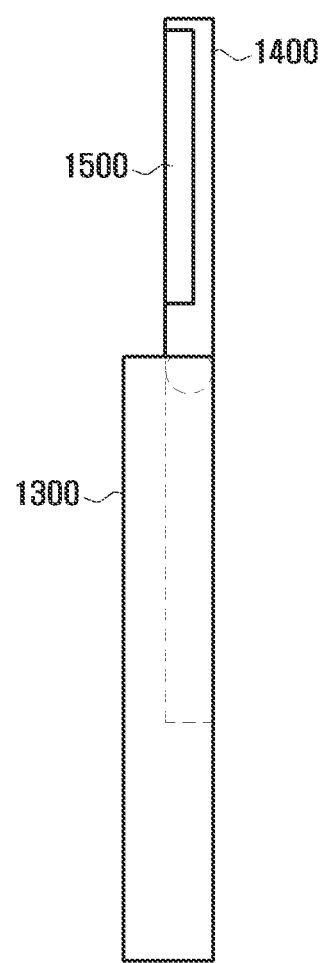

FIGS. 14 to 16 are views illustrating a use example of a second mobile terminal according to an exemplary embodiment of the present invention.

Referring to FIGS. 13 and 14, in a state in which an adaptor 1400 houses a first mobile terminal 1500 (e.g., a smart phone), the adaptor 1400 is housed in the adaptor reception groove 1310 of the second mobile terminal 1300.

Referring to FIGS. 14 and 15, the user rotates the adaptor 1400 housed in the groove 1310. Therefore, when the adaptor 1400 is perpendicular to the second mobile terminal 1300, the adaptor 1400 does not rotate but stops. When the adaptor 1400 is perpendicular to the second mobile terminal 1300, the user uses the adaptor 1400 as a stand of the second mobile terminal 1300.

Referring to FIGS. 15 and 16, the user further rotates the adaptor 1400 to be perpendicular to the second mobile terminal 1300. Therefore, when the adaptor 1400 forms an angle of 180° with the second mobile terminal 1300, the adaptor 1400 does not rotate but stops. Thereby, the user can use the first mobile terminal 1500 housed in the adaptor 1400 for audiovisual communication.

An adaptor and a mobile terminal according to the present invention are not limited to the foregoing exemplary embodiments, and various changes and modifications may be performed within the spirit and scope of the invention.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An adaptor for connecting a first mobile terminal and a second mobile terminal, the adaptor comprising:
   a first connector detachable from the second mobile terminal, electrically connected to the second mobile terminal, and that can be rotated;
   a main body having a terminal hole for housing the first mobile terminal; and
   a second connector positioned at the terminal hole and detachable from the first mobile terminal for electrically connecting the first connector and the first mobile terminal,
   wherein the adaptor receives image data from the first mobile terminal and outputs the received image data to the second mobile terminal to enable the second mobile terminal to display the image data.

2. The adaptor of claim 1, wherein the first connector is suppressed from rotating in a predetermined angle.

3. The adaptor of claim 2, further comprising:
   a fixing portion fixed to one surface of the main body;
   a rotation portion for rotating the fixing portion using the fixing portion as an axis and connected to the first connector; and
   a hinge portion for connecting the fixing portion and the rotation portion and having a stopper for suppressing the rotation portion from rotating.

4. An adaptor for connecting a first mobile terminal and a second mobile terminal, the adaptor comprising:
   a first connector detachable from the second mobile terminal, electrically connected to the second mobile terminal, and that can be rotated;
   a main body having a terminal hole for housing the first mobile terminal; and
   a second connector positioned at the terminal hole and detachable from the first mobile terminal for electrically connecting the first connector and the first mobile terminal,
   wherein the adaptor receives user input information from the second mobile terminal and outputs the received user input information to the first mobile terminal to enable the first mobile terminal to perform a function related to the user input information.

5. A mobile terminal having a touch screen, the mobile terminal comprising:
   a connector installed at a rear surface opposite to a front surface in which the touch screen is installed; and
   an adaptor for connecting the mobile terminal and another mobile terminal,
   wherein the adaptor comprises:
   a first connector detachable from the mobile terminal, electrically connected to the mobile terminal, and that can be rotated;
   a main body having a terminal hole for housing the other mobile terminal; and
   a second connector positioned at the terminal hole and detachable from the other mobile terminal for electrically connecting the first connector and the other mobile terminal.

6. The mobile terminal of claim 5, wherein the adaptor is suppressed from rotating in a predetermined angle.

7. The mobile terminal of claim 6, wherein the adaptor further comprises:
   a fixing portion fixed to one surface of the main body;
   a rotation portion for rotating the fixing portion using the fixing portion as an axis and connected to the first connector; and a hinge portion for connecting the fixing portion and the rotation portion and having a stopper for suppressing the rotation portion from rotating.

8. The mobile terminal of claim 5, wherein the mobile terminal is used for an input and an output of the other mobile terminal through the adaptor.

9. The mobile terminal of claim 8, wherein the adaptor receives image data from the other mobile terminal and outputs the received image data to the mobile terminal to enable the mobile terminal to display the image data.

10. The mobile terminal of claim 8, wherein the adaptor receives user input information from the mobile terminal and outputs the received user input information to the other mobile terminal to enable the other mobile terminal to perform a function related to the user input information.

11. The mobile terminal of claim 5, further comprising:
a display unit;
an interface unit for outputting image data received from the other mobile terminal through the adaptor to the display unit; and
a converter positioned between the display unit and the interface unit to convert the image data for display by the display unit.

12. The mobile terminal of claim 11, wherein the interface converter converts a mobile High-definition Link (mHL) to one of Low Voltage Differential Signaling (LVDS), a Mobile Industry Processor Interface (MIPI), and a Display Port (DP).

13. The mobile terminal of claim 11, wherein the converter converts a High Definition Multimedia Interface (HDMI) to one of Low Voltage Differential Signaling (LVDS), a Mobile Industry Processor Interface (MIPI), and a Display Port (DP).

14. The mobile terminal of claim 5, further comprising an adaptor reception groove for housing the adaptor located at a rear surface of the mobile terminal.

15. The mobile terminal of claim 5, further comprising a magnetic sensor to detect a rotation of the first connector.

16. The mobile terminal of claim 15, wherein the magnetic sensor detects a rotation of the first connector using a magnet installed in the other mobile terminal.

17. The mobile terminal of claim 15, wherein the mobile terminal causes an execution of a function on the other mobile terminal depending on a detected rotation of the first connector.

* * * * *